United States Patent [19]

Geleziunas

[11] Patent Number: 4,776,469

[45] Date of Patent: Oct. 11, 1988

[54] RACK FOR STORING LIDS

[76] Inventor: Rimas J. Geleziunas, 110 Bloor St. West, Suite 2103, Toronto, Ontario, Canada, M5S 2W7

[21] Appl. No.: 49,477

[22] Filed: May 14, 1987

[51] Int. Cl.⁴ .............................................. A47G 19/08
[52] U.S. Cl. .......................................... 211/41; 211/88
[58] Field of Search ..................... 211/41, 13, 71, 88, 211/72, 128, 40, 42, 89, 40, 48; 361/415

[56] References Cited

U.S. PATENT DOCUMENTS

| D. 28,437 | 3/1898 | Jones | 211/41 X |
|---|---|---|---|
| D. 217,491 | 5/1970 | Wooters | 211/41 X |
| 1,266,245 | 5/1918 | Fuhrmann | 211/41 |
| 1,842,118 | 1/1932 | Resnik et al. | 211/41 |
| 1,986,486 | 1/1935 | Swanson | 211/41 |
| 3,465,892 | 9/1969 | Taylor | 211/41 |

Primary Examiner—Ramon S. Britts
Assistant Examiner—Sarah A. Lechok Eley
Attorney, Agent, or Firm—Rogers, Bereskin & Parr

[57] ABSTRACT

A rack for storing lids has a base and a plurality of support members extending from the base. The base is intended for mounting on a vertical surface with the support members extending outwardly and upwardly. The support members are arranged in pairs, for locating and holding lids. Each support member has a ledge portion and a support arm extending upwardly. The ledge portions of each pair have inclined support surfaces which are inclinded downwardly towards one another, to center a lid.

13 Claims, 4 Drawing Sheets

RACK FOR STORING LIDS

FIELD OF THE INVENTION

This invention relates to a rack for storing domestic articles. This invention more particularly relates to a rack having pairs of support members for supporting lids for pans and the like.

BACKGROUND OF THE INVENTION

At the present time, in kitchens, a variety of utensils are stored. Typically, there will be numerous pots or pans, each having its own lid. Storing these can be a problem, as they occupy a large amount of space. Thus the pots themselves can be stacked within one another, storing the lids for them poses a problem. It is desirable that the lids should be stored, in a manner which keeps them tidy and makes them readily accessible. Further, any such storage arrangements should be capable of accommodating a variety of sizes of lids.

There are known proposals for lid storage racks. One known design, for use on the base of a cabinet or other flat surface, simply enables lids, plates or the like to be stored in a horizontal row. Another known design is formed from elongate wire, and is intended for mounting on a vertical surface. For each lid, there is a pair of arms that extend upwardly and outwardly, and which are joined together by a cross bar. This design is somewhat crude, and has various disadvantages. It does not properly allow for the different sizes of lids, and the cross bar can interfere with any knob or handle on the lid.

SUMMARY OF THE PRESENT INVENTION

In accordance with the present invention, there is provided a rack storing lids, the rack comprising:
a base member for mounting to a vertical support surface; and
a plurality of pairs of support members arranged in a row extending from the base member, for locating and holding lids, the support members of each pair being located on either side of the base member, and each support member comprising a ledge portion, which extends outwardly from the base and has an upper surface with the upper surfaces of each pair of support members angled inwardly and downwardly, and a support arm extending generally outwardly therefrom, whereby, each pair of support arms, together with an adjacent part of the base defines a slot for holding a lid, with the inclined upper surfaces centering that lid.

Each arm includes an inclined part extending upwardly and outwardly from the respective ledge portion at an angle sufficient to maintain an edge of a lid on the corresponding ledge portion, and a vertical part parallel to the base so as to extend vertically in use.

The base can include vertical side parts, with front faces that incline rearwardly towards the centre of the rack, to allow for the position of the lower edge of a lid. Also, ribbed areas can be provided on the front faces to grip the edges of lids.

The arrangement of the support members, particularly the inclined upper surfaces, is intended to automatically center lids. Further, the arms are such that handles or knobs in the center of the lids will not interfere with them. The arms also separate the lids, and thus prevents them banging into each other. In the case of metal lids, for example, a considerable amount of unwanted noise is generated if they are allowed to crash into one another.

The rack could also be used for other articles, for example pie plates, dishes. It is also conceivable that it could be used for other articles, such as gloves or ties.

BRIEF DESCRIPTION OF THE DRAWINGS

For a better understanding of the present invention, and to show more clearly how it can be carried into effect, reference will now be made, by way of example, to the accompanying drawings, which show a preferred embodiment of the present invention, and in which:

FIG. 5 shows a section along line 5—5 of FIG. 4.

DESCRIPTION OF THE PREFERRED EMBODIMENT

Figure 1:
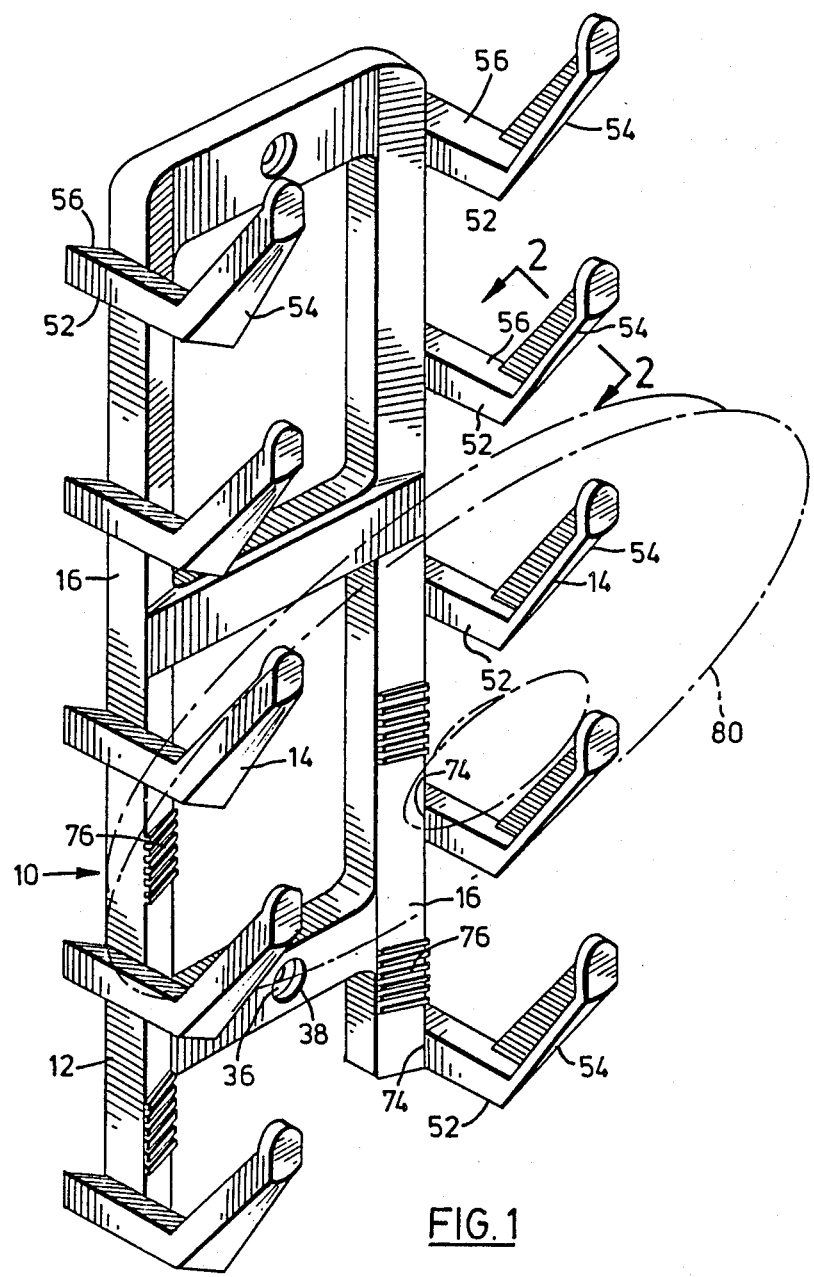
FIG. 1 shows a perspective view of a rack according to the present invention.

With reference to the accompanying drawings, a rack for holding lids or the like is generally designated by the reference 10. The rack 10 has a base 12, and support members 14 arranged in pairs.

The base 12 is a generally rectangular frame. It has two vertical side members 16, joined by a middle transverse member 18, an upper transverse member 20 and a lower transverse member 22. The upper transverse member 20 extends between the tops of the side members 16, whilst the lower transverse member 22 is spaced upwardly from the lower ends of the members 16.

Figure 3:
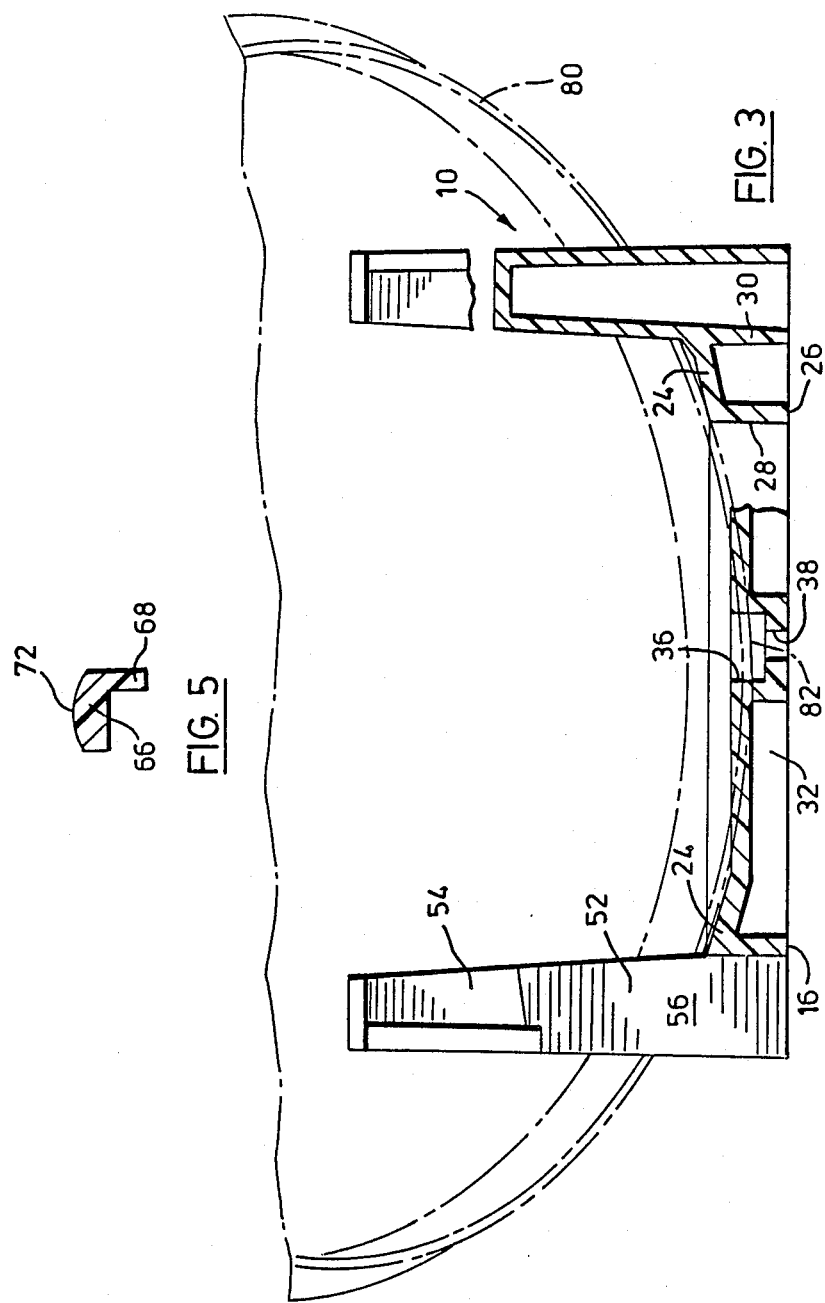
FIG. 3 shows a section along line 3—3 of FIG. 2.

The transverse members 18, 20 and 22 are each of uniform thickness throughout, as shown in FIG. 3. The vertical side members 16 each include an inclined front surface 24. Each surface 24 is inclined forwardly and outwardly, and is continuous with a front surface of the transverse members 18, 20 and 22.

As shown in FIG. 3, in section, each of the side members 16 has a vertical side face, perpendicular to a rear face. The rear face is continuous with the rear faces of the transverse members 18, 20 and 22, so as to form a rear mounting face 26.

As also shown in FIG. 3, the rack 10 is moulded in one piece from a plastic material. Consequently, the various components have a generally uniform wall thickness, and it is hollow as viewed from the rear. The wall thickness is approximately $\frac{1}{8}$ inches.

Figure 2:
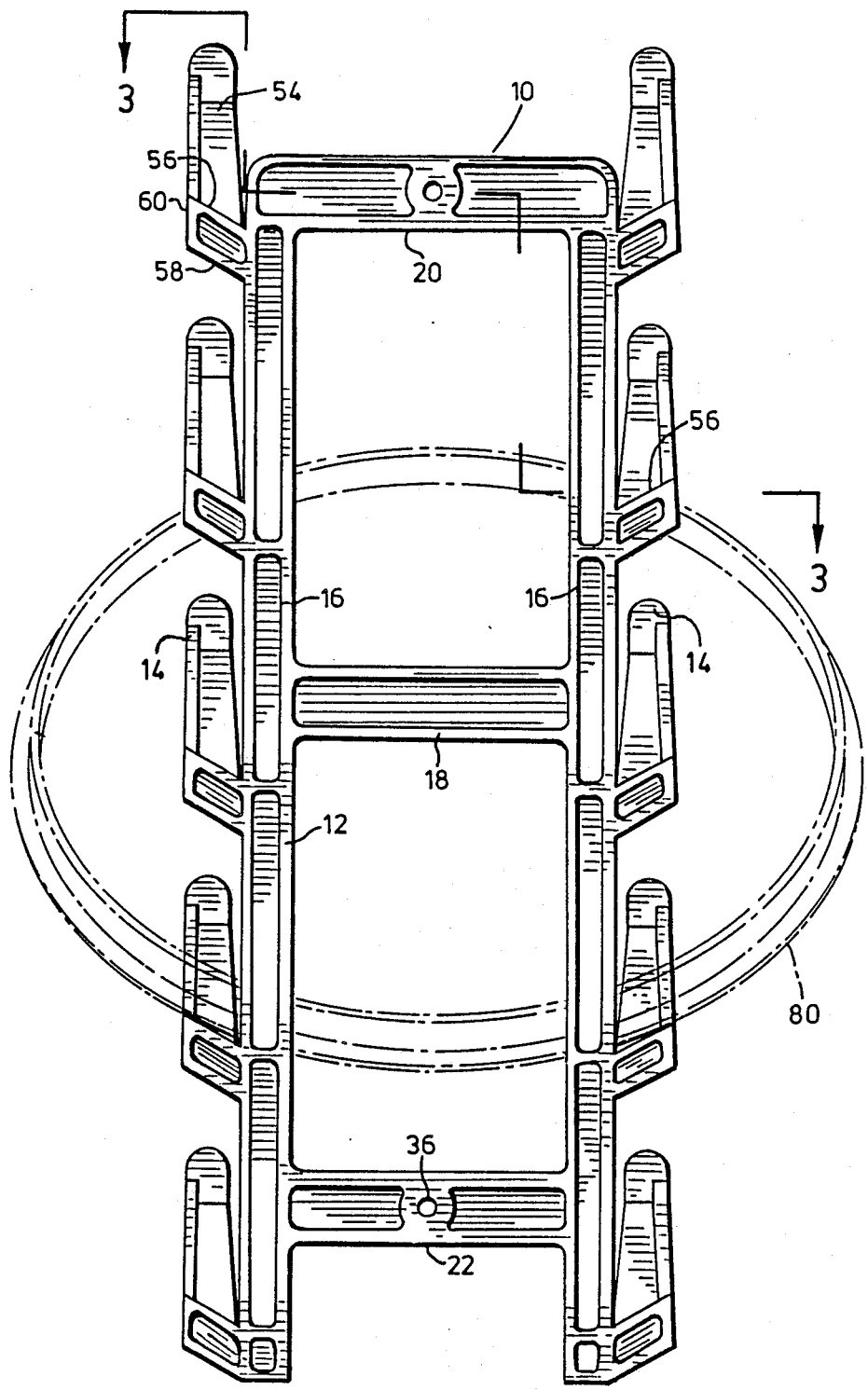
FIG. 2 shows a rear view of the rack of FIG. 1.

The side members 16 have side walls 28, 30, which extend along their height, and terminate at the upper transverse member 20. The side walls 32 of the transverse member 20 extend the full width of the rack 10, whilst the side walls 34 of the other transverse members 18, 22 extend between the side members 16 (FIG. 2).

As shown for the upper transverse member 20, there is a recess 36 provided in the center of the transverse member 20, with an opening 38, for receiving a screw (not shown). The lower transverse member 22 has a similar recess and openings 36, 38.

Extending out from the vertical side members 16 are the pairs of support members 14. In the embodiment shown, there are four pairs of support members 14. The support members 14 are all of similar dimensions, and are equally spaced. However, the exact size and spacing of the support members 14 could be varied as desired.

Each support member 14 has a ledge portion 52 and a support arm 54. The support members 14 are generally identical, and for each pair are symmetrical about a vertical plane extending through the recesses 36. Accordingly, for simplicity, just one support member 50 is described in detail.

The ledge portion 52 extends out sideways from the corresponding side member 16. The ledge portion 52 has an upper surface 56, that is inclined inwardly and downwardly. A lower surface 58 is correspondingly angled and parallel to the upper surface 56. An outer side surface 60 is vertical. As shown, each ledge portion 52 is hollow and has walls extending from the respective side wall 30, and of comparable thickness.

The support arm 54 is continuous with the ledge portion 52. The support arm 54 is shown in section in FIG. 5, and includes an inclined part 62 and a vertical part 64.

Figure 4:
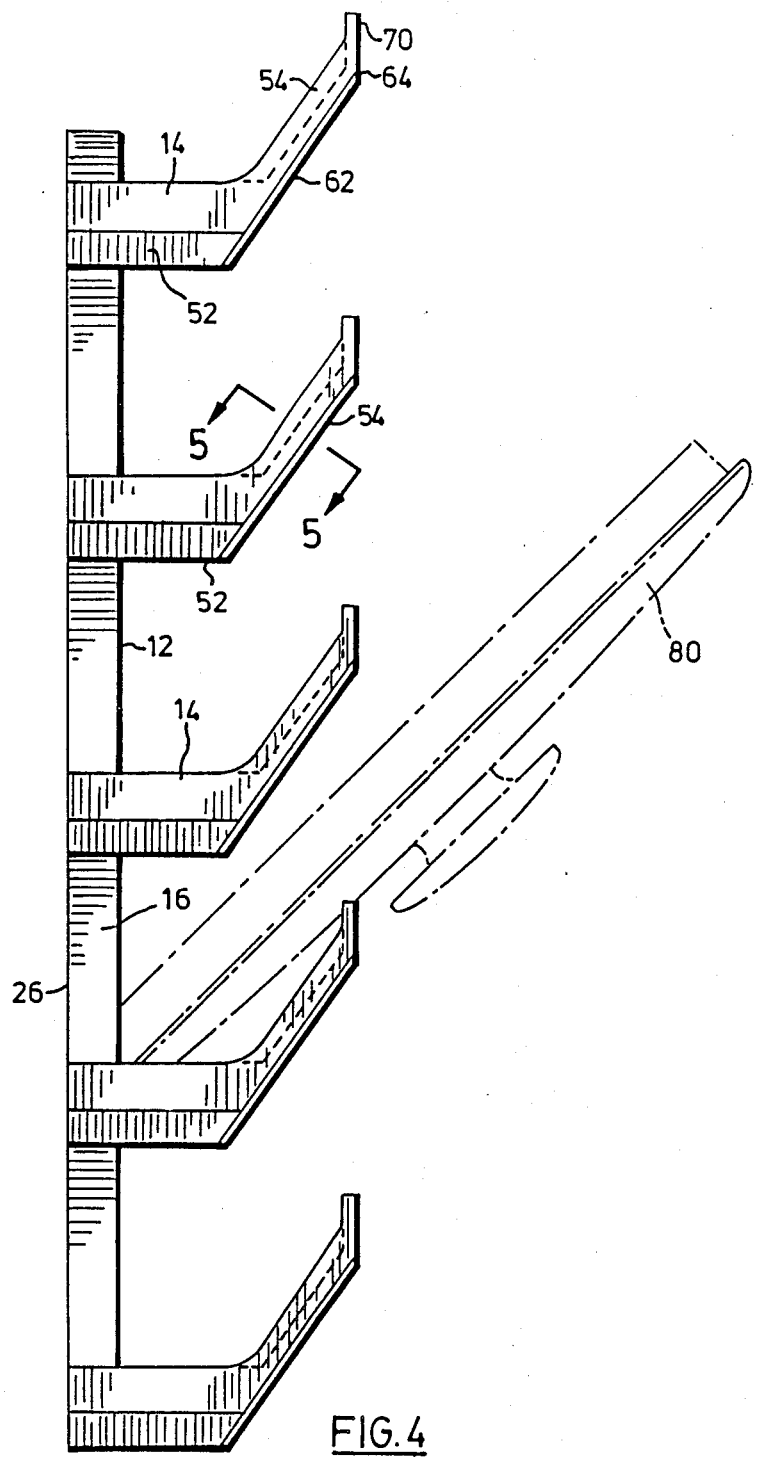
FIG. 4 shows a side view of the rack.

The inclined part 62 has a main limb 66, which is inclined, and which is continuous across the end of the ledge portion 54, to form a front, end wall thereof. A rib 68 of uniform height extends rearwardly from the main limb 66. At its upper end, the vertical part 64 forms a tip 70 having a rounded top. The vertical part or tip 70 has generally planar, vertical front and rear faces (FIG. 4). As shown in FIG. 5, the main limb 66 has a planar rear face, and a convex front face 72. Viewed from the front, the support arms 50 taper upwardly, with the width decreasing upwardly.

As shown in FIG. 1, where the support members 14 join the side members 16, there are reinforcing gussets 74 having faces angled at 45 degrees to the rear mounting face 26.

Additionally, for the lower two pairs of support members 50, ribbed areas 76 are provided on the front of the vertical side members 16. Each ribbed area 76 can include six ribs which are 0.05 inches wide, 0.05 inches wide and 0.05 inches apart.

With regard to general dimensions, the overall length of the rack 10, including the support members 14 can be approximately 14½ inches, and can have a width of approximately 5¼ inches. The width across the side walls 30 can be 4 inches, with each side member 16 being ½ inch wide. The transverse members 18, 20 and 22 and ¾ inch wide and ½ inch high or deep.

The support members 14 are spaced by 3 inches, and each has an overall length of 2.45 inches. The upper surfaces 56 of the ledge portions 52 are approximately 1¼ inches long in the direction perpendicular to the rear face 26. The main limbs 66 are inclined at an angle of 34 degrees to the vertical, and have an overall thickness of 0.18 inches, tapering to 0.125 inches at their edges. The ribs 68 are approximately 0.25 inches high, and 0.125 inches wide. The tips 70 are 0.625 inches high, and their outer faces are spaced by 2.875 inches from the rear mounting face 26.

In use, the rack 10 is mounted on a vertical surface, such as a wall or side of a cabinet, with the support members 14 directed upwards. It is then secured by screws. Then, lids 80 can be placed on the rack 10 as shown. Each lid 80 is held between one pair of support arms 14 and the base 12. The vertical orientation of the tips 70 ensures that they should contact the lid, irrespective of whether the lid has a small or large diameter. This should then prevent any tendency for the lid to tilt outwards. The provision of substantial spaces between each pair of support arms 14 provides room for any knobs or handles. Consequently, a wide variety of lid and handle shapes and sizes can be accommodated. When a lid 80 is placed on the rack 10, its upper part tends to tilt backwards, and consequently as shown, its rim or lip 82 tends to extend rearwardly, as viewed from above. To accommodate this, the inclined faces 24 are provided. The faces 24 enable the lip or rim 24 to extend rearwardly. The support members 14 additionally ensure that the lids do not contact each other. This should reduce unwanted noise. With the rack 10 moulded in plastic, any noise generated by contact of the lids with the rack should be minimal.

I claim:

1. A rack for storing lids, the rack comprising: a base, for mounting to a vertical surface, the base being generally rectangular and including two vertical side members, each of which includes a front face that inclines rearwardly towards the centre of the rack; and a plurality of pairs of support members arranged in a vertical row extending from the base, for locating and holding lids, the support members of each pair being located on either side of the base, and each support member comprising a ledge portion which extends generally perpendicularly and outwardly from the base and has an upper surface inclined inwardly and downwardly, and a support arm extending generally upwardly therefrom, and including a vertical part extending upwardly therefrom and parallel to said base whereby each pair of support arms together with an adjacent part of the base defines a slot for holding a lid, with the respective inclined surfaces centring that lid and with the inclined front faces of the side members accomodating the edge of the lid.

2. A rack as claimed in claim 1, wherein each support arm including an inclined part extending up from the respective ledge portion to the respective vertical part and the inclined part of each support arm comprises a main limb and a rib generally perpendicular thereto.

3. A rack as claimed in claim 2, wherein each main limb includes a front face that is inclined and continuous with the respective ledge portion.

4. A rack as claimed in claim 2, wherein the ledge portions extend outwardly and to one side of the base, with the base located between the ledge portions.

5. A rack as claimed in claim 2 or 4, wherein each support arm tapers, with its width decreasing upwardly.

6. A rack as claimed in claim 2, 3 or 4, wherein each support arm tapers, with its width decreasing upwardly, and wherein the main limb of each support arm includes a convex, rounded front surface.

7. A rack as claimed in claim 4, wherein each ledge portion includes a lower surface that is inclined and generally parallel to the corresponding upper surface.

8. A rack as claimed in claim 7, wherein each ledge portion is stiffer than its respective support arm, and has a cross-section that is greater than the respective support arm.

9. A rack as claimed in claim 1, 4, or 8 wherein, for at least one pair of support arms, the vertical side members include ribbed areas on their front faces adjacent and above the respective ledge portions.

10. A rack as claimed in claim 4 or 8, which includes five pairs of support arms, with each pair of support arms being equally spaced and of equal size.

11. A rack as claimed in claim 9, which is a unitary moulding in a plastic material.

12. A rack as claimed in claim 4, wherein the main limb of each support arm includes a straight front face that is inclined and is convex, and wherein each ledge portion in section is a quadrilateral which has a cross-section greater than the cross-section of the corresponding support arm and includes a lower surface parallel to the upper surface.

13. A rack as claimed in claim 10, which is a unitary moulding in a plastic material.

* * * * *